(12) United States Patent
Tong et al.

(10) Patent No.: US 9,105,934 B2
(45) Date of Patent: Aug. 11, 2015

(54) PLATINUM ADLAYERED RUTHENIUM NANOPARTICLES, METHOD FOR PREPARING, AND USES THEREOF

(75) Inventors: YuYe Tong, Gaithersburg, MD (US); Bingchen Du, Rockville, MD (US)

(73) Assignee: GEORGETOWN UNIVERSITY, Washington, DC (US)

( * ) Notice: Subject to any disclaimer, the term of this patent is extended or adjusted under 35 U.S.C. 154(b) by 1077 days.

(21) Appl. No.: 13/081,809

(22) Filed: Apr. 7, 2011

(65) Prior Publication Data

US 2011/0256469 A1 Oct. 20, 2011

Related U.S. Application Data

(60) Provisional application No. 61/321,984, filed on Apr. 8, 2010.

(51) Int. Cl.
| | |
|---|---|
| *B01J 23/42* | (2006.01) |
| *B01J 37/00* | (2006.01) |
| *B01J 23/00* | (2006.01) |
| *B01J 23/44* | (2006.01) |
| *B32B 19/00* | (2006.01) |
| *B32B 9/00* | (2006.01) |
| *B32B 15/02* | (2006.01) |
| *B32B 17/02* | (2006.01) |
| *B32B 21/02* | (2006.01) |

(Continued)

(52) U.S. Cl.
CPC ............. *H01M 4/8657* (2013.01); *B82Y 30/00* (2013.01); *H01M 4/92* (2013.01); *H01M 4/926* (2013.01); *H01M 8/1011* (2013.01); *Y02E 60/523* (2013.01)

(58) Field of Classification Search
USPC .................. 502/325, 339; 428/357, 403, 457; 977/773, 810, 840, 890
See application file for complete search history.

(56) References Cited

U.S. PATENT DOCUMENTS 6,551,960 B1 * 4/2003 Laine et al. .................... 502/327
7,029,514 B1 * 4/2006 Yang et al. ....................... 75/348

(Continued)

OTHER PUBLICATIONS

"A novel CO-tolerant PtRu core-shell structured electrocatalyst with Ru rich in core and Pt rich in shell for hydrogen oxidation reaction and its implication in proton exchange membrane fuel cell," Lei Zhang et al. Journal of Power Sources 196 (2011), pp. 9117-9123.*

(Continued)

*Primary Examiner* — Patricia L Hailey
(74) *Attorney, Agent, or Firm* — Matthew K. Ryan; Blaine M. Hackman; Frommer Lawrence & Haug LLP (57) ABSTRACT

A superior, industrially scalable one-pot ethylene glycol-based wet chemistry method to prepare platinum-adlayered ruthenium nanoparticles has been developed that offers an exquisite control of the platinum packing density of the adlayers and effectively prevents sintering of the nanoparticles during the deposition process. The wet chemistry based method for the controlled deposition of submonolayer platinum is advantageous in terms of processing and maximizing the use of platinum and can, in principle, be scaled up straightforwardly to an industrial level. The reactivity of the Pt(31)-Ru sample was about 150% higher than that of the industrial benchmark PtRu (1:1) alloy sample but with 3.5 times less platinum loading. Using the Pt(31)-Ru nanoparticles would lower the electrode material cost compared to using the industrial benchmark alloy nanoparticles for direct methanol fuel cell applications.

9 Claims, 8 Drawing Sheets

(51) Int. Cl.
*B32B 23/02* (2006.01)
*B32B 27/02* (2006.01)
*H01M 4/86* (2006.01)
*B82Y 30/00* (2011.01)
*H01M 4/92* (2006.01)
*H01M 8/10* (2006.01)

(56) References Cited

U.S. PATENT DOCUMENTS

| | | | | |
|---|---|---|---|---|
| 7,205,255 | B2* | 4/2007 | Yamamoto | 502/101 |
| 8,227,372 | B2* | 7/2012 | Lopez et al. | 502/182 |
| 8,288,308 | B2* | 10/2012 | Lopez et al. | 502/185 |
| 2006/0263675 | A1* | 11/2006 | Adzic et al. | 429/44 |
| 2008/0220296 | A1* | 9/2008 | Eichhorn et al. | 429/17 |
| 2011/0275009 | A1* | 11/2011 | Goto et al. | 429/506 |
| 2012/0046164 | A1* | 2/2012 | Tanaka et al. | 502/319 |
| 2012/0088651 | A1* | 4/2012 | Lin et al. | 502/5 |

OTHER PUBLICATIONS

"Ru@Pt core-shell nanoparticles for methanol fuel cell catalyst: Control and effects of shell composition," Navaneethan Muthuswamy et al. International Journal of Hydrogen Energy 38 (2013), pp. 16631-16641.*

Kuk, S.T.; Wieckowski, A. "Methanol electrooxidation on platinum spontaneously deposited on unsupported and carbon-supported ruthenium nanoparticles." A. Journal of Power Sources 141 (2005) 1-7.

Sarma et al. "Formation of Pt—Ru Nanoparticles in Ethylene Glycol Solution: An in Situ X-ray Absorption Spectroscopy Study." Langmuir 2007, 23, 5802-5809.

Lima et al. "On the electrocatalysis of ethylene glycol oxidation." Electrochimica Acta 49 (2003) 85-91.

Liu et al. "Physical and Electrochemical Characterizations of Microwave-Assisted Polyol Preparation of Carbon-Supported PtRu Nanoparticles." Langmuir 2004, 20, 181-187.

Jeng et al. "Performance of direct methanol fuel cell using carbon nanotube-supported Pt—Ru anode catalyst with controlled compositionJournal of Power Sources." 160 (2006) 97-104.

Neto et al. "Electro-oxidation of ethylene glycol on PtRu/C and PtSn/C electrocatalysts prepared by alcohol-reduction process." Journal of Applied Electrochemistry (2005) 35:193-198.

Du et al. "A volcano curve: optimizing methanol electro-oxidation on Pt-decorated Ru nanoparticles." Phys. Chem. Chem. Phys., 2009, 11, 8231-8239.

Santiago-Torres, P. "Synthesis and Characterization of Ruthenium Nanoparticles." Masters Thesis in Chemistry 2007, University of Puerto Rico, Mayaguez Campus.

* cited by examiner

PLATINUM ADLAYERED RUTHENIUM NANOPARTICLES, METHOD FOR PREPARING, AND USES THEREOF

INCORPORATION BY REFERENCE

This application claims the benefit of priority of U.S. Provisional Application No. 61/321,984, filed Apr. 8, 2010.

STATEMENT OF GOVERNMENT INTEREST

This invention was made in part with government support under grant number DE-FG02-07ER15895, awarded by the Department of Energy. The government has certain rights to this invention.

The documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. The applicants' also incorporate by reference the journal article "A volcano curve: optimizing methanol electro-oxidation on Pt-decorated Ru nanoparticles", *Phys. Chem. Chem. Phys.*, 11: 8231-8239 (published on web 26 Jun. 2009) which lists the inventors Bingchen Du and YuYe Tong among the authors of the article.

FIELD OF THE INVENTION

This invention relates to the deposition of platinum (Pt) adlayers on ruthenium (Ru) nanoparticles. The methods described herein permit controlled deposition of Pt. The resultant Pt-adlayered Ru nanoparticles provide optimized activity for electro-oxidation (EO) in fuel cells.

BACKGROUND OF THE INVENTION

The ongoing need for more efficient power sources has generated strong interest in fuel cell research. As opposed to batteries, fuel cells are energy conversion devices in which electrodes are supplied with a continuous feed supply of both fuel and oxidant, resulting in the conversion into electrochemical energy. Fuel cells are efficient and have little to no emissions.

Hydrogen gas has been studied as the fuel supply for fuel cells; however the inherent safety, handling and storage problems associated therewith present significant drawbacks. As a result, alternative fuel sources such as alcohols and formic acid are being explored. The alcohol is fed directly into the cell and undergoes oxidation at the anode while oxygen is reduced at the cathode.

Among these, methanol (MeOH) has been studied in direct methanol fuel cells (DMFCs), which are useful for many portable power applications and micro power applications such as, laptop computers, cell phones, etc. As a result, DMFCs have been an area of intense research directed toward alternative sources of energy.

As a liquid, methanol can integrate effectively with many applications of DMFCs, including transmissions and distribution systems that currently exist. As a fuel, methanol is advantageous in terms of also being readily available from renewable sources from biomass such as wood. Thus, the incorporation of DMFCs as alternative energy sources in many systems would reduce reliance on more commonly used energy sources such as oil and natural gas, rendering DMFCs of considerable interest from the perspective of green technology pursuits. Methanol, while having advantageous handling and storage properties along with high energy density, presents significant challenges in application to catalytic reactions necessary for use in DMFCs. Specifically, many catalysts have insufficient activity to completely oxidize MeOH, resulting in by-products of intermediate oxidation such as aldehydes and acids.

Platinum (Pt) has long been used as the major component of anode electrocatalysts for electro-oxidation (EO) of methanol in direct MeOH fuel cells (DMFCs) (*J. Appl. Electrochem.*, 1992, 22, 1-7). However, two major, long standing obstacles still exist that prevent large scale practical applications of the DMFC. One is the carbon monoxide (CO) poisoning during the EO of MeOH, which quickly lowers the catalytic activity of Pt. The other is the high loading of Pt needed in the anode to sustain the performance, which noticeably increases the cost of the whole fuel cell system.

Numerous efforts have been made both to improve the CO tolerance and to reduce Pt loading (*Langmuir*, 2003, 19, 6759-6769; *Phys. Chem. Chem. Phys.*, 2007, 9, 5476). For both purposes, binary or ternary Pt-based metallic/metal oxide catalysts, such as PtRu (*J. Phys. Chem. B*, 2002, 106, 9581-9589), PtNi (*J. Phys. Chem. B*, 2002, 106, 1869-1877), PtSn (*J. Power Sources*, 2007, 166, 87-91), and PtRuTiO$_2$ (*Electrochem. Commun.*, 2007, 9, 563-568) have been studied, among which, the PtRu alloy has been shown to have improved practical performance (*Platinum Met. Rev.*, 1996, 40, 150; *Catal. Today*, 1997, 38, 445-457).

Consequently, most of the recent research in this field has focused on manipulating PtRu from different perspectives, such as varying the molar ratio between Pt and Ru (*J. Phys. Chem.*, 1993, 97, 12020-12029), improving synthetic methods (*Appl. Catal., A*, 2005, 285, 24; *J. Phys. Chem. C*, 2008, 112, 1479), and adopting different carbon supporting materials (*Chem. Commun.*, 2004, 2766-2767; *Electrochim. Acta*, 2006, 52, 1697-1702; *Int. J. Hydrogen Energy*, 2008, 33, 427-433).

Recently, Brankovic et al. adopted a spontaneous deposition method (that was first used in reverse; depositing Ru on single crystal Pt surfaces, see *Langmuir*, 1997, 13, 5974-5978) to decorate the surface of carbon-supported RuNPs with Pt (*Electrochem. Solid-State Lett.*, 2001, 4, A217). The method involved a necessary step of reducing RuNPs with hydrogen gas at relatively high temperature (300° C.). The resulting NPs, according to that work, offered the advantage of maintaining the activity towards CO tolerance with a much reduced Pt loading of ~10 wt % compared to commercially available E-TEK PtRu (1:1) which has a Pt loading of ~66 wt %. More recently, Kuk and Wieckowski also applied a similar method to cover Ru and carbon-supported RuNPs with different Pt loading using repetitive hydrogen reduction and spontaneous depositions (*J. Power Sources*, 2005, 141, 1-7). While the Pt packing densities (PDs) were determined using inductively-coupled plasma mass spectrometry (ICP-MS), the analysis of the true surface coverage and the associated activity was complicated by the possibility of Pt penetrating into RuNPs and the observed sintering effect due to high temperature reduction.

Although this spontaneous deposition method opens up a promising way of fabricating anode materials of low Pt loading, handling high temperature hydrogen reduction is technically less appealing, and repetitive hydrogen reduction and spontaneous depositions are often tedious and struggle to achieve quantitative control of the Pt coverage. Furthermore, the procedure would be difficult to implement on a large industrial scale.

Citation or identification of any document in this application is not an admission that such document is available as prior art to the present invention.

SUMMARY OF THE INVENTION

In an attempt to address the technically important controllability of the Pt PD and the scalability of the operation, a superior, industrially scalable ethylene glycol (EG) reduction based wet chemistry method has been developed that allowed a quantitative control of the Pt PD on Ru NPs and optimized the activity of the EO of MeOH. The method comprises reduction of Pt salt using the mild reducing power of EG to cover the RuNPs. Careful electrochemical (EC) measurements showed that by varying the Pt:Ru molar ratio of the starting materials, the EG method enabled a relatively easy control of the Pt PD that followed the nominal Pt:Ru molar ratio linearly.

Furthermore, the Pt-adlayered RuNPs prepared via this method displayed revealing Pt PD-dependent EC characteristics in CO stripping and MeOH EO. In particular, improved long-term steady-state MeOH activity relative to industrial benchmark PtRu (1:1) alloy NPs was observed. Technologically, with the higher activity achieved and lower Pt loading, one could expect at significant decrease in catalytic material costs. Fundamentally, the observation of the volcano curve as a function of the Pt coverage can be largely rationalized by the so-called "bifunctional mechanism" in which the electrooxidation of the poisonous CO intermediate preferentially adsorbed at Pt sites occurs at a lower potential due to the supply of oxygen-containing species formed at the adjacent Ru sites.

Accordingly, it is an object of the invention to not encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. §112, first paragraph) or the EPO (Article 83 of the EPC), such that Applicants reserve the right and hereby disclose a disclaimer of any previously described product, process of making the product, or method of using the product.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

These and other embodiments are disclosed or are obvious from and encompassed by, the following Detailed Description.

BRIEF DESCRIPTION OF THE DRAWINGS

The following detailed description, given by way of example, but not intended to limit the invention solely to the specific embodiments described, may best be understood in conjunction with the accompanying drawings, in which.

DETAILED DESCRIPTION

In an attempt to address the technically important controllability of the Pt PD and the scalability of the operation, a superior, industrially scalable ethylene glycol (EG) reduction based wet chemistry method has been developed that allowed a quantitative control of the Pt PD on Ru NPs and optimized the activity of the EO of MeOH. The method comprises reduction of Pt salt using the mild reducing power of EG to cover the RuNPs. Careful electrochemical (EC) measurements showed that by varying the Pt:Ru molar ratio of the starting materials, the EG method enabled a relatively easy control of the Pt PD that followed the nominal Pt:Ru molar ratio linearly.

Furthermore, the Pt-adlayered RuNPs prepared via this method displayed revealing Pt PD-dependent EC characteristics in CO stripping and MeOH EO. In particular, improved long-term steady-state MeOH activity relative to industrial benchmark PtRu (1:1) alloy NPs was observed. Technologically, with the higher activity achieved and lower Pt loading, one could expect at significant decrease in catalytic material costs, ultimately resulting in greater practicability for commercial applications. Fundamentally, the observation of the volcano curve as a function of the Pt coverage can be largely rationalized by the so-called "bifunctional mechanism" in which the electrooxidation of the poisonous CO intermediate preferentially adsorbed at Pt sites occurs at a lower potential due to the supply of oxygen-containing species formed at the adjacent Ru sites.

One embodiment of the invention is a process for depositing a platinum (Pt) adlayer on a ruthenium (Ru) nanoparticle comprising a polyol reduction.

In one aspect of the process, the polyol includes but is not limited to polyethylene glycol, polypropylene glycol, ethylene glycol and propylene glycol and the like. In yet another aspect, the polyol is an ethylene glycol.

In another aspect of the process, the steps comprise:
a. cleaning the surface of the ruthenium nanoparticles so that the surface is free of ruthenium oxide by reducing the surface of the ruthenium nanoparticles;
b. dispersing ruthenium nanoparticles ultrasonically into a first solution of ethylene glycol,
c. heating the first solution to between about 50-400° C.,
d. redispersing the heated first solution into a second solution of ethylene glycol, wherein said second solution further comprises a platinum compound
e. ultrasonicating said second solution, and
f. heating said second solution to between about 50-280° C., thereby depositing a platinum adlayer on the ruthenium nanoparticle.

In another aspect of the process, the first solution is heated to between about 100-200° C. In yet another aspect of the process, the first solution is heated to between about 120-160° C.

In another aspect of the process, the second solution is heated to between about 90-160° C. In yet another aspect of the process, the second solution is heated to between about 100-140° C.

In still another aspect of the process, the first solution is heated to between about 120-160° C., and the second solution is heated to between about 100-140° C.

In another aspect of the process, no further reduction of the surface of the Ru nanoparticles is necessary after step a. during the process of platinum adlayering.

In another aspect of the process, the platinum compound comprises a platinum (IV) compound. In still another aspect of the process, the platinum compound is selected from the group consisting of $(NH_4)_2PtCl_4$, dihydrogen hexahydroxyplatinate(IV), iodotrimethylplatinum(IV), platinum(IV) halides (including, but not limited to, platinum(IV) chloride), platinum(IV) oxides and hydrates thereof, potassium hexabromoplatinate(IV), potassium hexachloroplatinate (IV), potassium hexacyanoplatinate(IV), sodium hexachloroplatinate(IV) hexahydrate, cis-tetrachlorodiammine platinum(IV), trans-tetrachlorodiammine platinum(IV), (trimethyl) cyclopentadieneylplatinum(IV), (trimethyl) methylcyclopentadienylplatinum(IV), and dioxobis (triphenylphosphine)platinum(IV). In yet another aspect of the process, the platinum (IV) compounds include, but are not limited to $H_2PtCl_6$.

In another aspect of the process, the platinum compound comprises a platinum (II) compound. In still another aspect of the process, the platinum compound is selected from the group consisting of $(NH_4)_2PtCl_6$, bis(ethylenediamine)platinum(II) chloride, 1,1-cyclobutanedicarboxylatodiammineplatinum(II) (i.e.—carboplatin), diammineplatinum(II) nitrite, dibromo(1,5-cyclooctadiene)platinum(II), dichlorobis(benzonitrile)platinum(II), cis-dichlorobis(diethylsulfide) platinum(II), cis-dichlorobis(pyridine)platinum(II), cis-dichlorobis(triethylphosphine)platinum(II), dichlorobis (triphenylphosphine)platinum(II), dichloro(1,4-cyclooctadiene)platinum(II), cis-dichlorodiammine platinum(II), trans-dichlorodiammine platinum(II), di-μ-chloro-dichlorobis(ethylene)diplatinum(II), dichloro(dicyclopentadienyl)platinum(II), di-μ-iodobis(ethylenediamine) diplatinum(II) nitrate, diiodo(1,5-cyclooctadiene(platinum (II), hydrido(dimethylphosphinous acid-kP) [hydrogen bis (dimethylphosphinito-kP)]platinum(II), platinum(II) acetylacetonate, platinum(II) halides (including, but not limited to, platinum(II) bromide, platinum(II) chloride, and platinum(II) iodide), platinum(II) cyanide, platinum(II) hexafluoroacetylacetonate, potassium bis(oxalate)palatinate (II) dihydrate, potassium tetrabromoplatinate(II), potassium tetrachloroplatinate(II), potassium tetracyanoplatinate(II), potassium tetranitroplatinate(II), potassium trichloroammineplatinate(II), sodium tetrachloroplatinate(II) hydrate, tetrammineplatinum(II) chloride monohydrate, tetrammineplatinum(II) hydroxide hydrate, tetrammineplatinum(II) nitrate, tetrammineplatinum(II) tetrachloroplatinate(II), chloro(2,2':6',2"-terpyridine)platinum(II) chloride dihydrate, dichloro(1,10-phenanthroline)platinum(II), dichloro(1,2-diaminocyclohexane)platinum(II), dichloro(2,2':6',2"-terpyridine)platinum(II) dihydrate, dichlorobis(ethylenediamine) platinum(II), oxalatobis(triethylphosphine)platinum(II), trans-dichlorobis(triethylphosphine)platinum(II), and trans-dichlorobis(triphenylphosphine)platinum(II).

In yet another aspect of the process, the molar ratio of Pt:Ru is from a range selected from the group consisting of about 1:50 to about 1:1.10; about 1:30 to about 1:1.25; and about 1:20 to about 1.5.

In yet another aspect of the process, greater than 80% of the platinum used in the process forms an adlayer on the ruthenium nanoparticle. In still another aspect, greater than about 90% of the platinum used forms an adlayer on the ruthenium nanoparticle. In still another aspect, greater than about 95% of the platinum used forms an adlayer on the ruthenium nanoparticle.

In yet another aspect of the process, the packing density of platinum is quantitatively controlled. In another aspect, the packing density of platinum on the nanoparticle is between about 0.05 and 0.93. In another aspect, the packing density of platinum on the nanoparticle is between about 0.1 and 0.7. In another aspect, the packing density of platinum on the nanoparticle is between about 0.2 and 0.4. In another aspect, the packing density of platinum on the nanoparticle is between about 0.28 and 0.35.

In yet another aspect of the process, when a predetermined amount of platinum gives rise to a known yield and coverage of the surface area of the ruthenium nanoparticle, the process conditions are reproducible to within about 5-10% of the known yield by weight and within about 5-10% of total Pt adlayering of the Ru nanoparticle based on the total adlayering of the Pt adlayered Ru nanoparticles. In still another aspect, the process conditions are reproducible within about 1% yield and about 1% adlayering. In still another aspect, the process conditions are reproducible within about 0.1% yield and about 0.1% adlayering. In still another aspect, the process conditions are reproducible within about 0.01% yield and about 0.01% adlayering.

In still another aspect, less than 10% sintering of the nanoparticle occurs during the deposition process. In still another aspect, less than 5% sintering of the nanoparticle occurs during the deposition process. In still another aspect, less than 2% sintering of the nanoparticle occurs during the deposition process. In still another aspect, sintering of the nanoparticle does not occur during the deposition process.

In a further aspect, the Pt adlayered Ru nanoparticle contains less than about 10% by weight platinum-ruthenium alloy based on the total weight of the Pt adlayered Ru nanoparticle. In a further aspect, the Pt adlayered Ru nanoparticle contains less than about 5% by weight platinum-ruthenium alloy based on the total weight of the Pt adlayered Ru nanoparticle. In a further aspect, the Pt adlayered Ru nanoparticle contains less than about 2% by weight platinum-ruthenium alloy based on the total weight of the Pt adlayered Ru nanoparticle. In a further aspect, the Pt adlayered Ru nanoparticle contains no platinum-ruthenium alloy based on the total weight of the Pt adlayered Ru nanoparticle.

Another embodiment of the invention is a Pt adlayered Ru nanoparticle, e.g., Pt adlayered Ru nanoparticle obtained by the process described above.

In one aspect, the Pt adlayered Ru nanoparticle is not carbon supported.

In one aspect, the platinum adlayer is segregated on the surface of the ruthenium nanoparticle. In another aspect, the adlayer is a monoatomic adlayer.

Still another embodiment of the invention is a homogeneous composition of Pt adlayered Ru nanoparticles, wherein about 90% of the nanoparticles are comprised of Pt adlayered Ru nanoparticles wherein the platinum adlayering on said ruthenium nanoparticle covers from about 30%-50% of the surface area of the ruthenium.

One aspect of this embodiment is a homogenous composition wherein about 95% of the nanoparticles are comprised of Pt adlayered Ru nanoparticles, wherein the platinum adlayering on said ruthenium nanoparticle covers from about 25%-45% of the surface area of the ruthenium. Another aspect of this embodiment is a homogeneous composition wherein about 98% of the nanoparticles are comprised of Pt adlayered Ru nanoparticles wherein the platinum adlayering on said ruthenium nanoparticle covers from about 25%-45% of the surface area of the ruthenium. Still another aspect of this embodiment is a homogeneous composition wherein about 90%, but less than about 100% of the nanoparticles are comprised of Pt adlayered Ru nanoparticles, wherein the platinum adlayering on said ruthenium nanoparticle covers from about 25%-45% of the surface area of the ruthenium. Still another aspect of this embodiment is a homogeneous composition wherein about 90%, but less than about 100% of the nanoparticles are comprised of Pt adlayered Ru nanoparticles, wherein the platinum adlayering on said ruthenium nanoparticle covers from about 28%-35% of the surface area of the ruthenium.

Still another embodiment of the invention is a fuel cell comprising of Pt adlayered Ru nanoparticle, e.g. the Pt adlayered Ru nanoparticle obtained by the process described above. Construction of the fuel cell can be accomplished by means well known to those of skill in the art, e.g. the methods described in *Designing & Building Fuel Cells*, by Colleen Spiegel, McGraw-Hill Professional (2007).

In one aspect of the embodiment, the fuel cell is selected from a hydrogen fuel cell, a methanol fuel cell and a formic acid fuel cell.

In another aspect of the embodiment, the methanol fuel cell is a direct methanol fuel cell.

In another aspect of the embodiment, the methanol fuel cell comprising a Pt adlayered Ru nanoparticle has an electrochemical activity which is about 100%-about 200% higher than a methanol fuel cell comprising a PtRu alloy wherein the ratio of Pt:Ru is about 1:1. In another aspect of the embodiment, the methanol fuel cell comprising a Pt adlayered Ru nanoparticle has an electrochemical activity which is about 125%-about 175% higher than a methanol fuel cell comprising a PtRu alloy wherein the ratio of Pt:Ru is about 1:1. In still another aspect of the embodiment, the methanol fuel cell comprising a Pt adlayered Ru nanoparticle has an electrochemical activity which is about 145%-about 155% higher than a methanol fuel cell comprising a PtRu alloy wherein the ratio of Pt:Ru is about 1:1.

The invention will now be further described by way of the following non-limiting examples.

EXAMPLES

Controlled Pt adlayers were deposited on commercial Ru nanoparticles (NPs) using an industrially scalable one-pot ethylene glycol (EG) reduction based method and were characterized by X-ray diffraction (XRD), electrochemical (EC) CO stripping voltammetry, inductively-coupled plasma optical emission spectrometry (ICP-OES), X-ray photoemission spectroscopy (XPS), and transmission electron microscopy (TEM).

Compared with the previously used "spontaneous deposition", the wet chemistry-based EG method is less technically demanding, i.e. no need to handle high-temperature hydrogen reduction, offers a better control of the Pt packing density (PD), enables the formation of stable, segregated Pt surface adlayers for optimal tuning and use of Pt, and effectively prevents NPs sintering. Two batches of a total of 11 (8 vs. 3) samples with different values of Pt PD ranging from 0.05 to 0.93 were prepared, with a time interval of more than 18 months between the syntheses of the two batches of samples, and an excellent reproducibility of results was observed.

All samples were investigated in terms of methanol (MeOH) electro-oxidation (EO) by cyclic voltammetry (CV) and chronoamperometry (CA). Although the peak current of CV increased as the Pt content increased, the long-term steady-state MeOH electro-oxidation current density of the Pt-adlayered RuNPs measured by CA showed a volcano curve as a function of the Pt PD, with the maximum appearing at the PD of 0.31.

Other than ethylene glycol, the incorporation of other polyols such as, but not limited to, propylene glycol, glycols, glycerol, polyethylene glycol, polypropylene glycol, alkyloxyalkylene glycols, polyetheralkylene glycols, and the like.

The optimal peak activity was ~150% higher than that of the industrial benchmark PtRu (1:1) alloy NPs and could deliver the same performance at half the electrode material cost. Fundamentally, such a volcano curve in the reaction current is the result of two competing processes of the EO of MeOH: the triple dehydrogenation of MeOH that prefers more Pt ensemble sites, and the elimination of poisonous CO that is enhanced by more adjacent Ru/Pt sites via the so-called bifunctional mechanism and also by possible electronic effects at low Pt coverages.

In an attempt to address the technically important controllability of the Pt PD and the scalability of the operation, a superior, industrially scalable ethylene glycol (EG) reduction based wet chemistry method has been developed that allowed a quantitative control of the Pt PD on Ru NPs and optimized the activity of the EO of MeOH. It started with commercially available Ru NPs (~3 nm). Pt salt was then reduced using the mild reducing power of EG to cover the Ru NPs. Careful electrochemical (EC) measurements showed that by varying the Pt:Ru molar ratio of the starting materials, the EG method enabled a relatively easy control of the Pt PD that followed the nominal Pt:Ru molar ratio linearly. ICP optical emission spectrometry (ICP-OES) and X-ray photoemission (XPS) measurements were carried out on three of the second batch samples and gave consistent Pt PDs as determined by the EC method.

Detailed transmission electron microscopy (TEM) measurements on these three samples showed very similar particle size distributions and no evidence of pure Pt NP formation. Powder X-ray diffraction (XRD) measurements were carried out on two representative samples of the first batch and three samples of the second batch. These results indicated that the samples were neither pure Ru, Pt, nor PtRu alloy, consistent with the formation of Pt adlayers on RuNPs. Furthermore, the as-prepared Pt-adlayered RuNPs displayed revealing Pt PD-dependent EC characteristics in CO stripping and MeOH EO. In particular, a volcano curve, peaking at a Pt PD of 0.31 in long-term steady-state MeOH activity as gauged by chronoamperometric (CA) current measured at 60 min and 0.2 V (with respect to the Ag/AgCl (3M) reference electrode), was observed. The peak activity was ~150% higher than that of the industrial benchmark PtRu (1:1) alloy NPs (*J. Catal.*, 2001, 203, 1-6).

Technologically, with the higher activity achieved, and lower Pt loading, it is possible to decrease catalytic material costs, in some cases by greater than 50%. Fundamentally, the observation of the volcano curve as a function of the Pt coverage can be largely rationalized by the so-called "bifunctional mechanism" in which the electrooxidation of the poisonous CO intermediate preferentially adsorbed at Pt sites occurs at a lower potential due to the supply of oxygen-containing species formed at the adjacent Ru sites (*J. Electroanal. Chem.*, 1975, 60, 267).

All commercial high-surface area Ru, PtRu (1:1) alloy, and Pt NPs used either as the starting material or references in this study were courtesy of Johnson-Matthey. It has been experimentally confirmed that, when in contact with air, RuNPs are readily oxidized to form $RuO_x$ (*Electrochem. Commun.*, 2000, 2, 475-479; *J. Phys. Chem. B*, 2001, 105, 5238-5243).

Previously published data has reported that the presence of $RuO_x$ makes it difficult to deposit Pt onto the surface of RuNPs (*J. Phys. Chem. B*, 2005, 109, 17775-17780; *J. Electrochem. Soc.*, 2003, 150, A1108). Thus, the first step is to completely reduce the Ru surface. Previous studies employed hydrogen gas reduction, usually at relatively high temperature (200 to 300° C.), to reduce the Ru surface (*Solid-State Lett.*, 2001, 4, A217; *J. Power Sources*, 2005, 141, 1-7). In order to vary the Pt coverage, tedious, repetitive hydrogen reduction and spontaneous deposition cycles were employed, which could easily cause unwanted penetration of Pt into the RuNPs and electrocatalyst sintering (*Power Sources*, 2005, 141, 1-7). Consequently, it has become challenging to control and tune the Pt PD. That is, the Pt PD is not known a priori. It would also be quite difficult to scale up this procedure for potential industrial applications.

Here, a wet chemistry based, homogeneous reaction-like procedure has been developed using EG as both reaction medium and reductant for the reduction of RuNPs and the subsequent deposition of Pt (*Phys. Chem. Chem. Phys.*, 2009, 11, 8231-8239). This new approach is advantageous in two respects. One is that the homogeneous-reaction-like medium is better at preventing sintering (vide infra) and is, in principle, industrially scalable. The other is that the mild reducing power of EG offers better control of Pt deposition on RuNPs.

1. PREPARATION OF THE Pt-ADLAYERED RuNPs

Figure 1:
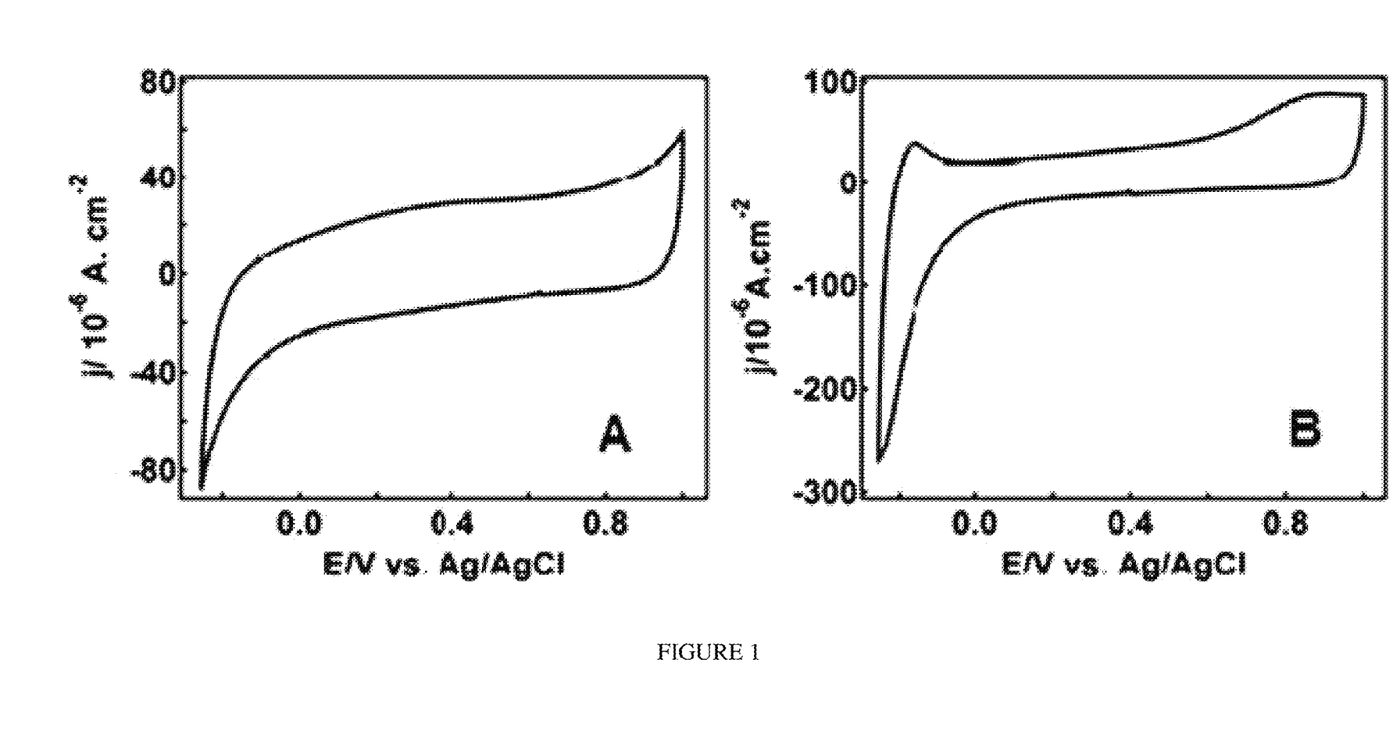
FIG. 1 is a comparison of the CVs of (A) the as-received RuNPs and (B) the EG-cleaned RuNPs.

Samples were prepared as follows: 5 mg of the 3 nm Johnson-Matthey (J-M) RuNPs was dispersed ultrasonically into EG to form a homogeneous ink, which was heated at 140° C. for 2 h with vigorous stirring to reduce oxide species on the Ru surface. The efficiency of this reduction step is clearly demonstrated by comparing the corresponding CVs of the RuNPs as shown in FIG. 1. According to Brankovic et al. (*J. Electroanal. Chem.*, 2002, 524-525, 231) the large cathodic peak at around 0.2 V in the CV of the cleaned RuNPs (FIG. 1B) was due to the adsorption of oxygen-containing species, e.g. OH groups, and could be considered a hallmark of well reduced RuNPs. Notice that this cathodic peak was largely absent for the as-received Ru NPs because the surface had already been covered by $RuO_x$. Green et al. (*J. Phys. Chem. B*, 2002, 106, 1036-1047) however, attributed this peak to a co-adsorption of hydrogen and oxygen-containing species. In any case, the contributions from the adsorption of oxygen-containing species distinguish Ru from Pt and Pd in that the latter adsorb only hydrogen in this potential region.

The cleaned J-M RuNPs were then collected and rinsed with ethanol and re-dispersed ultrasonically into a fresh EG solution with the calculated volume of $H_2PtCl_6$ solution that gave the desired nominal Pt:Ru molar ratio. After a 30 min long ultrasonication, the mixture was heated at 120° C. for 4 h to reduce Pt(IV) to Pt(0) on the surface of the J-M RuNPs. The final product was collected and rinsed several times with ethanol. The first prepared batch consisted of eight samples with nominal Pt:Ru molar ratios of 1:20, 1:10, 1:6, 1:5, 1:4, 1:3, 1:2, and 1:1.5, respectively and the second batch of three samples with nominal Pt:Ru molar ratios of 1:13.3, 1:4, and 1:2.7, respectively, with an interval of more than 18 months between them. It was found that the degree of dispersiveness of the starting RuNPs and their reductive cleanness were critically important to obtaining good reproducibility.

2.2 ELECTROCHEMISTRY

The working electrode was prepared as follows. The as-prepared Pt-adlayered RuNPs were transferred into a mixed solution of 2-propanol and 5 wt % Nafion® (Du Pont, Inc) solution. It was found that the following ratio of the above ingredients gave the optimum EC results: 1 mg PtRu sample, 0.2 ml 2-propanol, 1 µl Nafion solution. The mixture was then ultrasonicated for at least 10 min to form a uniform suspension which was drop-cast onto the surface of a commercial (Bioanalytical) 3 mm-diameter glassy carbon (GC) electrode. The electrode surface was air dried under a gentle Ar flow and rinsed with a copious amount of Milli-Q water (18.2 MS2 cm) to eliminate loosely attached NPs.

All EC experiments were carried out in an Ar-blanketed, conventional three-electrode EC cell using an EG&G273A potentiostat (Princeton Applied Research) controlled by a PC with the CoreWare software package (Scribner). All CVs were recorded with a scan rate of 50 mV $s^{-1}$. The commercial GC electrode, Pt gauze and Ag/AgCl (3M) (Bioanalytical) were used as working, counter, and reference electrodes, respectively. All electrode potentials in this paper were cited with respect to the Ag/AgCl (3M) reference electrode (0.290

V with respect to RHE) and all current densities were calculated using the total surface area as determined by the CO stripping peak. A 0.1M $HClO_4$ solution prepared with Milli-Q water was used as the electrolyte.

For CO stripping experiments, ultrahigh purity CO gas (MG Industries) was bubbled for 2 min followed by Ar bubbling for another 5 min. During the whole process, potential was held at 0 V. At least two cycles of CVs were recorded to make sure that all of the CO molecules oxidized were from the electrode surface, not from the residual CO in the electrolyte solution. For EO of MeOH, a 0.1 M $HClO_4$ solution with 0.5 M MeOH was used.

In the CA experiments which were run first, the electrode was pre-cleaned by holding the potential at 0 V until the current decayed to a negligible level, and then the MeOH was injected under an active stiffing condition. The CA curves were recorded while the potential was held at 0.2 V for 1 h. Under the same conditions, the background current was measured without the presence of MeOH and was subtracted from the CA curve. After the CA measurements, multiple cycles were run to obtain the stable and repeatable EO of MeOH CVs that are shown herein.

2.3 XRD, TEM, XPS, AND ICP-OES

XRD measurements were carried out using a Rigaku RAPID curved IP X-ray powder diffractometer with Cu Kx radiation (1.5406 Å) and an image plate detector. For XRD sample preparation, the as-prepared samples were dried in a vacuum desiccator and then transferred into a 0.5 mm diameter sample tube (Mark-Rohrchen) which was ready for measurement use after flame-sealing.

TEM samples were prepared by depositing diluted NP suspensions onto carbon-coated copper grids. The images were taken on a JOEL JEM-2100 FE-TEM at the Nanoscale Imaging Spectroscopy and Properties Lab, University of Maryland.

XP spectral data were acquired on a Kratos Axis Ultra DLD using an Al Kx (1486.7 eV) source. Samples were drop-cast from sonicated methanol suspensions onto cleaned Si substrates. Experiments were run on two different spots of the same substrate to ensure the consistency of the measurements.

ICP-OES measurements were conducted in the axial mode using a PerkinElmer Optima 5300 DV ICP-OES instrument. Operating conditions were as follows: power=1.5 kW; nebulizer gas flow=0.6 L $min^{-1}$; auxiliary gas flow=0.5 L $min^{-1}$; sample uptake=1 mL $min^{-1}$. A MiraMist nebulizer and cyclonic spray chamber were used to introduce the samples into the ICP. The calibration was performed by using the method of standard additions to compensate for any matrix effects. Pt 265.945 and Ru 240.272 were observed to determine the Pt and Ru sample concentrations with Sc 357.634 as an internal standard emission line. Three to four different aliquots were prepared for each sample and two measurements were performed on each aliquot. The average of these measurements is reported. As a control, the Johnson-Matthey PtRu (1:1) alloy NPs sample was analyzed with the Pt-adlayered samples in two independent runs. The averaged results of the Pt:Ru ratios from the alloy sample were 1.14±0.03 and 1.10±0.06, respectively.

3. RESULTS AND DISCUSSION

3.1 Pt Packing Density (PD): the Formation of Segregated Atomic Adlayers

The state of the Pt deposited on the RuNP surface is addressed first. Technically, it is still a challenge to determine the fraction of Pt surface area in Pt-based bimetallic, particularly Pt—Ru, NPs. For pure Pt, the electrochemically active surface area of Pt has been routinely determined by using the charge associated with hydrogen desorption (J. Appl. Electrochem., 1996, 26, 30-35), CO stripping (J. Phys. Chem., 1995, 99, 10423), or Pt oxide reduction (J. Phys. Chem. B, 2005, 109, 17775-17780; J. Electrochem. Soc., 2006, 153, B260-B277).

The former two methods, however, may produce large uncertainty if used for Pt—Ru bimetallic surface due, respectively, to the interference of the adsorption/desorption of oxygen-containing species (see FIG. 1B) and the indiscriminate nature of CO adsorption with respect to the Pt and Ru sites. We therefore adopted a method that combines the CO stripping and Pt oxide reduction. Because of the indiscriminate nature of CO adsorption, CO stripping with a well-known reaction stoichiometry (2e per CO oxidation and the charge density of 420 $\mu C\ cm^{-2}$ was used for calculating the surface area) provides a good and straightforward estimate of the total surface area accessible to CO adsorption. On the other hand, using Pt oxide reduction charge to determine the Pt surface area is more complicated because the reaction stoichiometry is not as well defined as the CO oxidation (J. Phys. Chem., 1995, 99, 10423).

Figure 2:
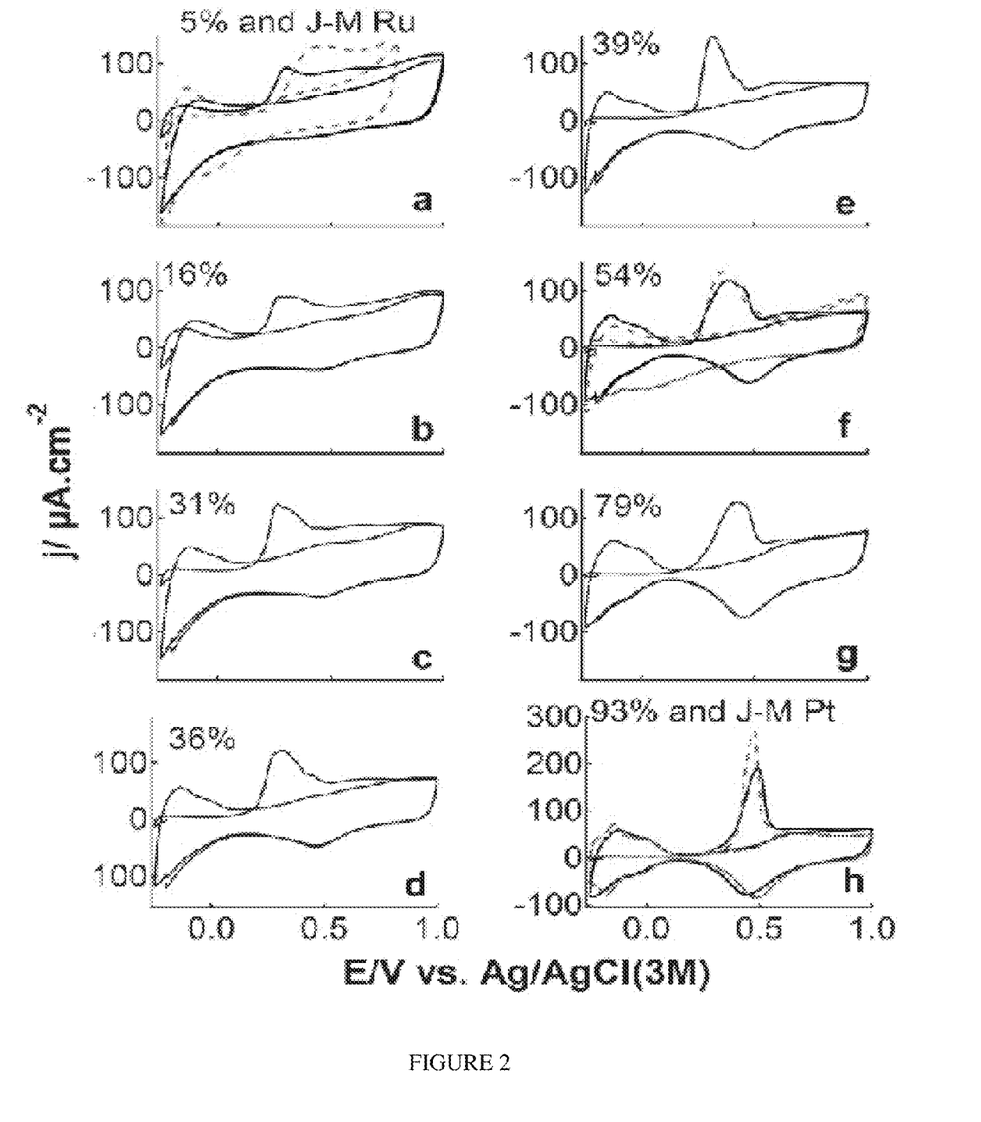
FIG. 2 shows the CO stripping CVs and, thereafter, those of the eight Pt-decorated RuNP samples of the first batch. The dashed CVs in (a), (f), and (h) are those of pure J-M Ru, J-M PtRu (1:1) alloy, and J-M pure Pt NPs that are used as references for comparison (J-M refers to product obtained from Johnson Matthey). The percentage numbers are the values of Pt PD calculated by the method described in the text. Reproducible results were obtained on the three samples of the second batch as shown in FIG. 5i of the ESIw.

However, it can still offer a reasonable estimate of the Pt surface area, particularly when the corresponding charge density is reasonably well calibrated by a known quantity (J. Phys. Chem. B, 2005, 109, 17775-17780). Here, commercially available J-M Pt NPs were used as the reference in which the Pt oxide reduction charge was calibrated by the CO stripping charge (see the dashed CV in FIG. 2(h)). This gave a charge density of 400 $\mu C\ cm^{-2}$ that we used to calculate the Pt surface area (notice that this charge density value is very close to the one obtained by Kozlowska et al. (J. Electroanal. Chem., 1973, 43, 9). The Pt PD was then calculated by the ratio between the surface area determined by the Pt oxide reduction, which was Pt specific, and that determined by the CO stripping.

FIG. 2 shows the CO stripping CVs of the eight samples of the first prepared sample batch. The dashed CVs in FIGS. 2(a), (f), and (h) are those of the J-M Ru (the starting material), J-M PtRu (1:1) alloy, and pure J-M Pt NPs, respectively, used as references for the purpose of comparison. Reproducible results were obtained on the three samples of the second batch as shown in FIG. S1 in the ESI†. Using these data, the Pt PDs were calculated by the approach described above and the values obtained are listed in Table 1.

For the purpose of comparison, the values of the nominal PD calculated using the nominal Pt:Ru molar ratios are also listed. Here, we assumed that all the Pt(IV) were reduced to Pt(0) on the metallic Ru surface sites that acted as nucleation centers for the Pt deposition (J. Phys. Chem. B, 2005, 109, 17775-17780) and then formed adlayers of mono-atomic height. Taking an average size of 3 nm (see the TEM results below), the dispersion of the J-M RuNPs was estimated to be ~40% according to the Benfield's calculation (J. Chem. Soc., Faraday Trans., 1992, 88, 1107).

Figure 3:
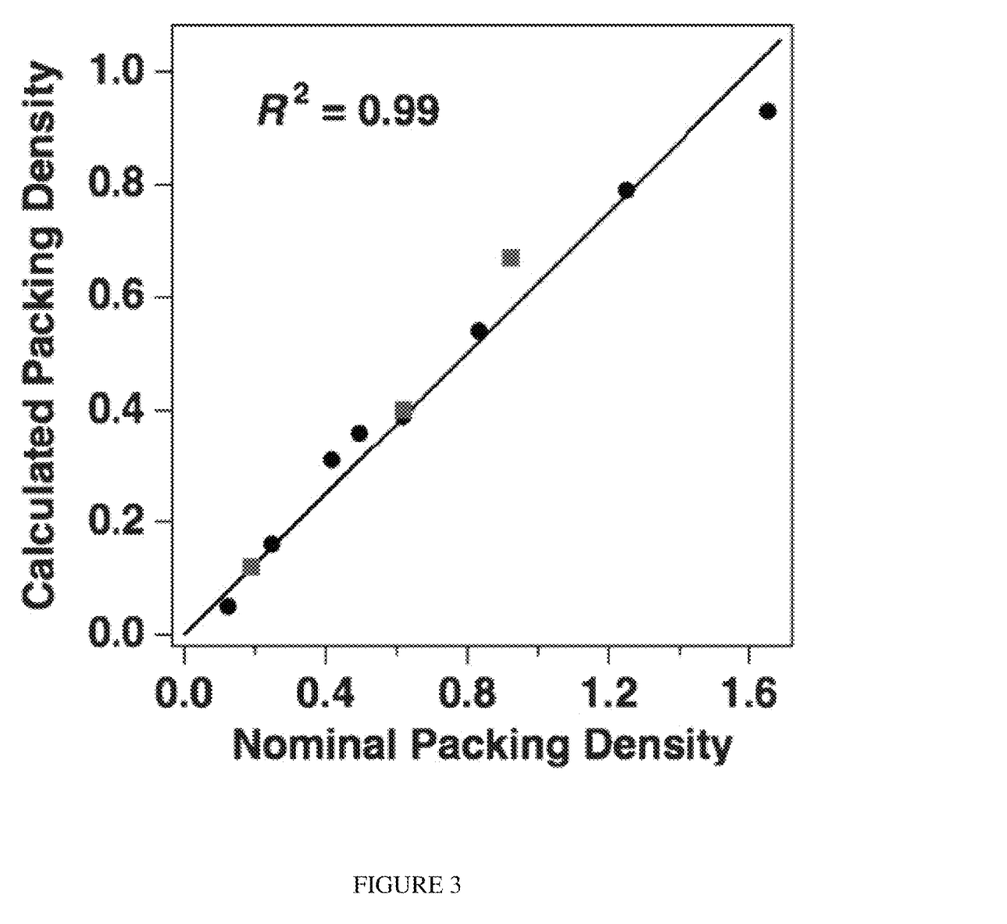
FIG. 3 shows the linear relationship between the measured and the nominal Pt packing density (PD). Squares are for the three, 2nd batch samples. The straight line goes through the origin.

Thus, the values of the nominal Pt PD were then calculated by equation: PD=Pt:Ru molar ratio/0.40. Notice that the values of the Pt PD as determined by the charges of Pt oxide reduction and CO stripping, although being constantly lower than the respective nominal ones (likely due to the value of 400 $\mu C/cm^2$ overestimating the charge density for Pt oxide reduction on Ru surface (a value of 250 $\mu C/cm^2$ would give a slope of 1) and/or to 3D packing), followed the trend of the nominal PD linearly (y=ax with $R^2$=0.99, FIG. 3), therefore enabling a quantitative control of the Pt PD in one-pot synthesis. The squares in FIG. 3 are from the three samples of the second batch, demonstrating excellent reproducibility.

The Pt PDs determined by ICP-OES for the three samples of the second batch are, respectively, 0.36, 0.66 and 0.86, which are in a good agreement with the nominal Pt PDs shown in Table 1. For the XPS measurements on the same samples, the RuNP diameter (ca. 3 nm) is >2× the inelastic mean free path (IMFP, see below), thus modeling these systems as a 2-dimensional Ru surface was used.

The attenuation of photoemission from the Ru core by the Pt overlayer was accounted for using the NIST standard reference database 82 (NIST Electron Effective Attenuation Length Database, Ver. 1.1) using an IMFP of 1.329 nm at 462 eV (Ru 3d binding energy, 1025 eV kinetic energy). The Ru 3d intensity was compared to the Pt 4d and 4f. Representative XP spectra are shown in FIG. S2 in the ESI†. Assuming a 0.7 nm Pt overlayer thickness (0.27 attenuation factor) and neglecting any other surface adsorbed species, the model analysis gave the Pt PD values as 0.55, 0.72 and 1.35, respectively. If an additional 0.5 nm carbon overlayer was used to model the ubiquitous surface adsorption, the corresponding PD values became 0.31, 0.40 and 0.79, respectively, in reasonable agreement with the values shown in Table 1. The fact that such high Pt contents were obtained from the XPS data without using the Ru core-Pt shell structure suggested that what we had synthesized were indeed Ru@Pt NPs.

TABLE 1

Comparison of the nominal and measured Pt packing densities

| Pt:Ru ratio | 1:20 | 1:13.3* | 1:10 | 1:6 | 1:5 |
|---|---|---|---|---|---|
| Nominal PD | 0.12 | 0.19 | 0.25 | 0.42 | 0.50 |
| Measured PD | 0.05 | 0.12 | 0.16 | 0.31 | 0.36 |
| Pt:Ru ratio | 1:4 | 1:3 | 1:2.7* | 1:2 | 1:1.5 |
| Nominal PD | 0.62 | 0.83 | 0.92 | 1.25 | 1.65 |
| Measured PD | 0.39 (0.40*) | 0.54 | 0.67 | 0.79 | 0.93 |

(*indicates the 2$^{nd}$ sample batch)

Finally, for facilitating the following discussions, the as-prepared Pt-adlayered Ru samples are named as Pt(EC-measured PD)-Ru, e.g. Pt(16)-Ru=16% Pt-adlayered Ru.

Another important question is whether the Pt was deposited on the RuNP surface or formed pure Pt NPs. For this purpose, TEM and XRD measurements were performed on the three samples of the second batch and on the starting RuNPs. XRD measurements of two representative samples of the first batch (Pt(31)-Ru and Pt(93)-Ru) were obtained. The average particle sizes measured (with 150 counts for each sample) by TEM are 3.1±0.4 nm, 3.1±0.3 nm, 3.2±0.3 nm and 3.0±0.4 nm for pure RuNPs, Pt(12)-Ru, Pt(40)-Ru, and Pt(67)-Ru, respectively.

Figure 4:
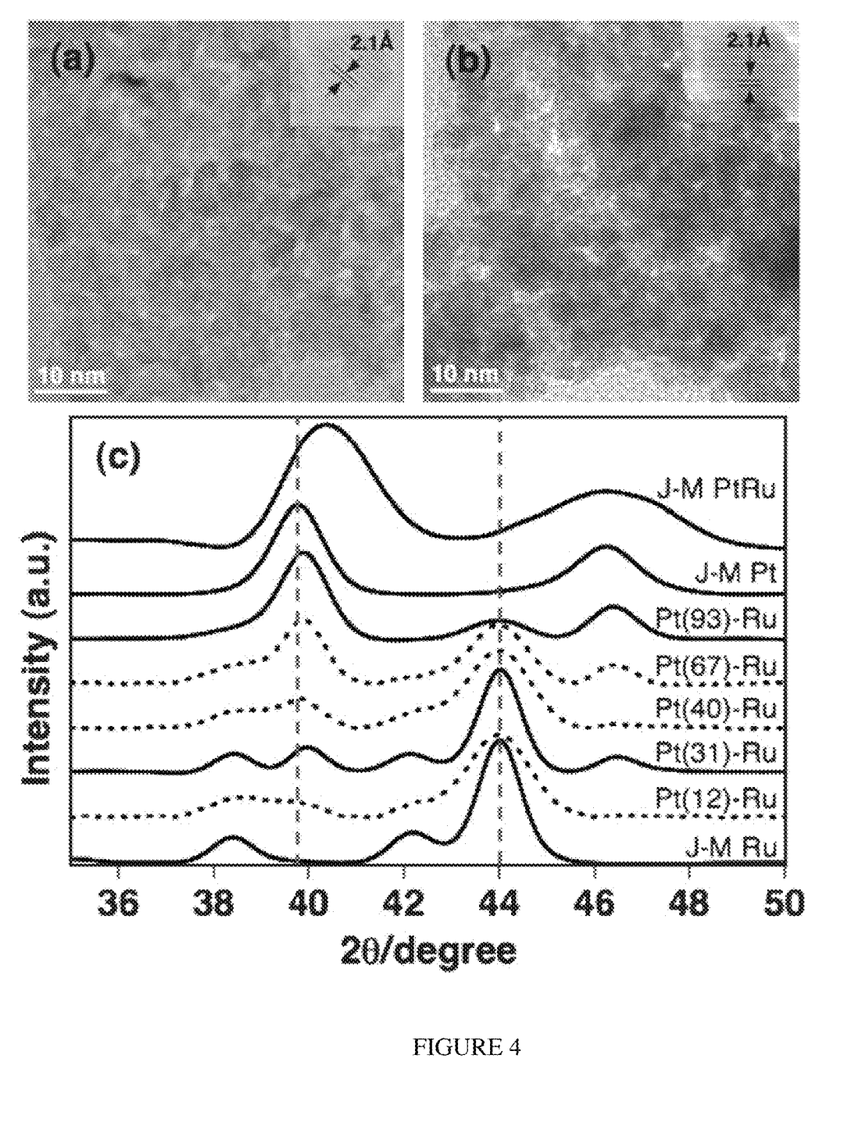
FIG. 4 shows the TEM images of (a) the starting RuNPs and (b) Pt(67)-Ru. The insets are the corresponding HRTEM snapshots where the distance between two adjacent atomic planes was measured to be 0.21 nm for both samples. (c) XRD patterns within the small angle range for two representative Pt-decorated Ru samples of the 1st batch and for the three samples of the 2nd batch. Those for pure J-M Pt, J-M PtRu alloy, and pure RuNPs are also shown for comparison. The vertical dashed lines indicate the respective standard angle positions of Pt(111) (left) and Ru(101) (right) as references.

From these TEM data, it is clear that no sintering of the NPs occurred and that the Pt shell was predominantly of mono-atomic height. FIGS. 4(a) and (b) compare the representative TEM images of the pure Ru and Pt(67)-Ru (see FIG. S3 in the ESI† for the TEM images of Pt(12)-Ru and Pt(40)-Ru). The insets are the corresponding high resolution TEM (HRTEM) images. By measuring, almost exhaustively, the distances between adjacent atomic planes as revealed by the HRTEM images (insets in FIGS. 4(a) and (b)), no evidence of Pt NP formation was found: all measured distances were about 0.21 nm (FIG. 4(b)), the same as that measured on pure RuNPs (FIG. 4(a)).

The results of XRD are shown in FIG. 4(c) together with those of the pure J-M Pt, J-M PtRu (1:1) alloy, and the pure starting J-M RuNPs for comparisons. The XRD of the J-M Pt and RuNPs reproduced all standard peak positions of which the main peaks within the angle range are located at 38.38° (100), 42.15° (002), 44.00° (101) for Ru (PDF#06-0663) and at 39.76° (111), 46.24° (200) for Pt (PDF#04-0802). The vertical dashed lines in FIG. 4(c) indicate the respective standard positions of Pt(111) (left) and Ru(101) (right) as references.

As can be seen in FIG. 4(c), the Ru(101) peak amplitude decreases gradually but the peak position remains the same as the Pt PD increases. These indicate that the RuNPs were gradually covered by Pt and no PtRu alloy was formed. At the same time, a growing peak corresponding to Pt appears with a peak position slightly larger than, but not exactly at, that of Pt(111). Using Bragg's law ($\lambda$=2d sin $\theta$), the d corresponding to the Pt(93)-Ru peak (2$\theta\theta$=39.91°) is 0.2256 nm. This value is very close to the height (0.2248 nm) of a Pt atom sitting in a close-packed fashion at a three-fold site of a Ru(0001) surface.

Because of the mismatch of the close-packed atomic distances between Pt (0.2772 nm) and Ru (0.2701 nm), the height of a pseudo-morphic growth of a Pt(111) monolayer on a Ru(0001) surface is expected to be larger than 0.2248 nm. On the other hand, the d of a close-packed Pt(111) plane is 0.2265 nm. Therefore, the d value of 0.2256 nm strongly suggests that the Pt adlayers formed were predominantly of mono-atomic height. The growth of the peak intensity indicated that the Ru surface was covered more and more by Pt adlayers. Similar intensity was also reported recently for the synthesized Ru@Pt NPs with 1 to 2 Pt atomic layers (*Nat. Mater.*, 2008, 7, 333-338). Such Ru@Pt structure was further corroborated by the strong dissimilarity between the XRD pattern of Pt(93)-Ru and that of J-M PtRu alloy NPs (*Surf Sci.*, 1993, 293, 67-80; *Electrochim. Acta*, 2005, 51, 754-763) that largely eliminates any major formation of alloy in Pt(93)-Ru.

The formation and growth of the Pt adlayer on the RuNP surface are further corroborated by the EC data shown in FIG. 2. For all the coverage values, no separate peak, expected for pure Pt NPs, was observed (*Fuel Cells*, 2006, 6, 190-202), indicating that few, if any, pure Pt NPs were formed during the Pt deposition. For Pt(5)-Ru (FIG. 2a), two features in the CO stripping CV are worth highlighting: one is the appearance of a narrower and small peak that was negatively shifted by as much as 0.17 V with respect to the broader CO stripping peak observed on the pure J-M RuNPs (dashed CV in FIG. 2a). This may be a direct manifestation of the bifunctional mechanism well-articulated for a Pt—Ru surface (*J. Phys. Chem.*, 1995, 99, 16757-16767; *J. Phys. Chem. B*, 1999, 103, 5522-5529) as well as a possible additional electronic (ligand and strain) effect (*Adv. Catal.*, 2000, 45, 71-129; *J. Am. Chem. Soc.*, 2002, 124, 468-473; *J. Chem. Phys.*, 2004, 120, 10240), thus indicating a direct deposition of Pt on Ru. The other is the broad shoulder at the high potential that is different from that of the pure J-M Ru NPs but can be reasonably assigned to the CO oxidation at the Ru sites distant from the deposited Pt sites. As the Pt PD increased, the low-potential Pt—Ru peak grew larger at the expense of the broader high-potential Ru peak. These gradual and monotonic changes suggest that the Pt went onto the Ru surface, forming nanosize Pt islands instead of forming pure Pt NPs, which is very similar to cases of Ru-adlayered Pt NPs (*J. Phys. Chem. B*, 2005, 109, 16230-16243).

In contrast to the PtRu alloy NPs in which no well-defined Pt oxide reduction peak was observed (see dashed CV in FIG. 2(f)), the 11 Pt-adlayered Ru NP samples studied here all showed well defined Pt oxide reduction peaks that enabled the Pt surface area to be determined. This observation attests that no PtRu alloy was formed, but, rather, a segregated Pt adlayer on the Ru surface.

Additionally, the monotonic decrease in the double-layer current as the Pt coverage increased also indicates that the Ru surface was gradually covered up by the Pt. Similar observations on Ru-adlayered Pt NPs were made previously (*J. Catal.*, 2001, 203, 1-6; *J. Phys. Chem. B*, 1998, 102, 193-199; *Phys. Chem. Chem. Phys.*, 2004, 6, 1792) in that, for Ru-adlayered Pt NPs, the deposition of Ru was accompanied by an increase in the double-layer capacitance, a decrease in the hydrogen adsorption area and a change in the oxide stripping peak (*J. Phys. Chem. B*, 2005, 109, 16230-16243). Large double-layer capacitance of the characteristics of pure RuNPs would appear if physically separated Pt and RuNPs did exist (*Fuel Cells*, 2006, 6, 190-202; *Langmuir*, 2008, 24, 2191-2199). However, this is not observed here. In summary, observations made from several independent perspectives together indicate the formation of Pt adlayers on Ru NPs surface.

Figure 5:
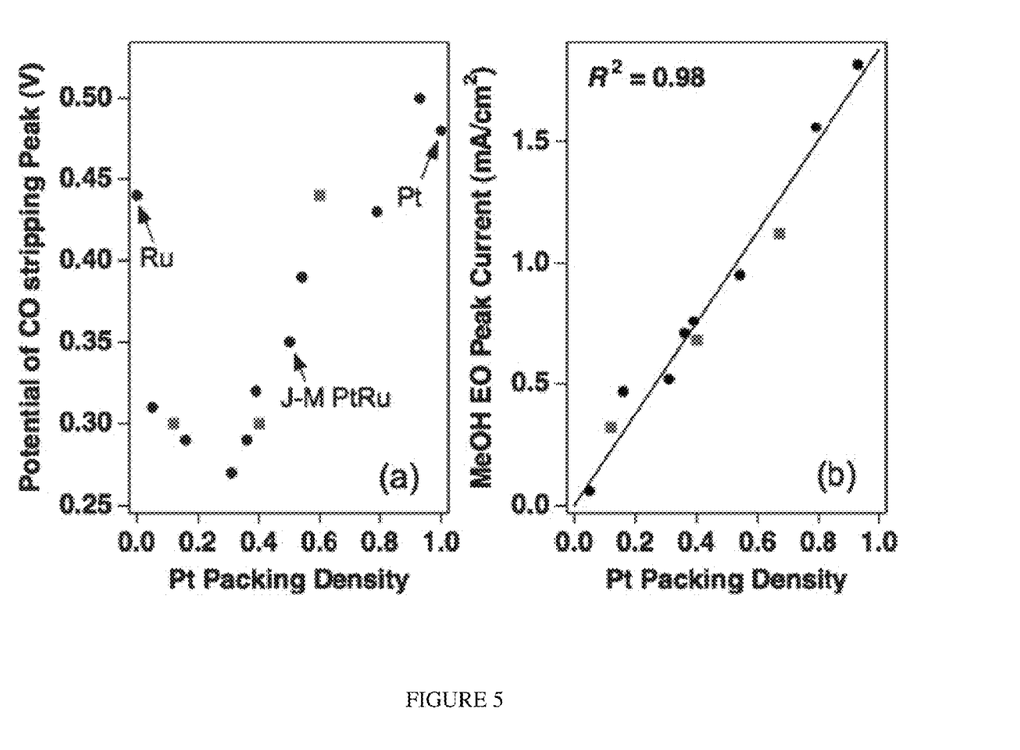
FIG. 5 shows (a) The Pt coverage dependence of the CO stripping peak potentials. The CO stripping peak potentials of the pure J-M Ru, J-M PtRu (1:1) alloy, and J-M Pt NPs (as labeled) are also shown in the figure for comparison. (b) A linear relationship between the MeOH EO peak current and the Pt PD. The straight line goes through the origin. The squares are of the three samples of the 2nd batch.

The variations in the shape and potential of the CO stripping peak as a function of Pt PD are shown in FIG. 5a. As the Pt PD increased, it started with a large (0.17 V) negative shift that peaked at the Pt PD of 0.31. However, the shift is less negative than that observed on the Ru-adlayered Pt NPs (*J. Catal.*, 2001, 203, 1-6; *J. Am. Chem. Soc.*, 2002, 124, 468-473). At the same time, it shows a fast rising front and a slow decreasing back, consistent with a dominant electro-oxidation of CO at the peripheral Ru/Pt sites (*J. Phys. Chem. B*, 2005, 109, 16230-16243). The peak then moved positively in the opposite direction until the potential value of the pure Pt NPs was recovered at the Pt PD of 0.93, accompanied by a change to a slow rising front and a fast decreasing back which indicates a dominant EO of CO on Pt terrace sites, in agreement with a fully Pt covered Ru surface. Indeed, the latter sample showed characteristics almost identical to those of the pure Pt NPs (FIG. 2(*h*) and vide infra).

In addition, although the Pt(54)-Ru and the J-M PtRu (1:1) alloy NPs showed very similar CO stripping peaks, their overall CVs were dissimilar (FIG. 2(*f*)), implying different surface structure, electronic properties and catalytic behaviors. Most importantly, the pattern shown in FIG. 5(*a*) suggests that, for the Pt adlayer-Ru substrate systems studied here, the bifunctional mechanism was the dominant force in achieving the enhanced CO-eliminating ability and the active sites were likely to exist along the peripheries of the Pt adlayers, similar to the cases of Ru-adlayered Pt surfaces (*Langmuir*, 1998, 14, 1967-1970; *J. Electroanal. Chem.*, 2002, 524-525, 261). On the other hand, although the electronic effects of the Ru substrate on the Pt adlayers might play a stronger synergistic role at the lower Pt PDs (*Adv. Catal.*, 2000, 45, 71-129; *J. Am. Chem. Soc.*, 2002, 124, 468-473), it would become smaller and smaller as evidenced by the recovering of the characteristics of the pure Pt surface towards the high Pt coverage.

3.2 MeOH Electro-Oxidation

Figure 6:
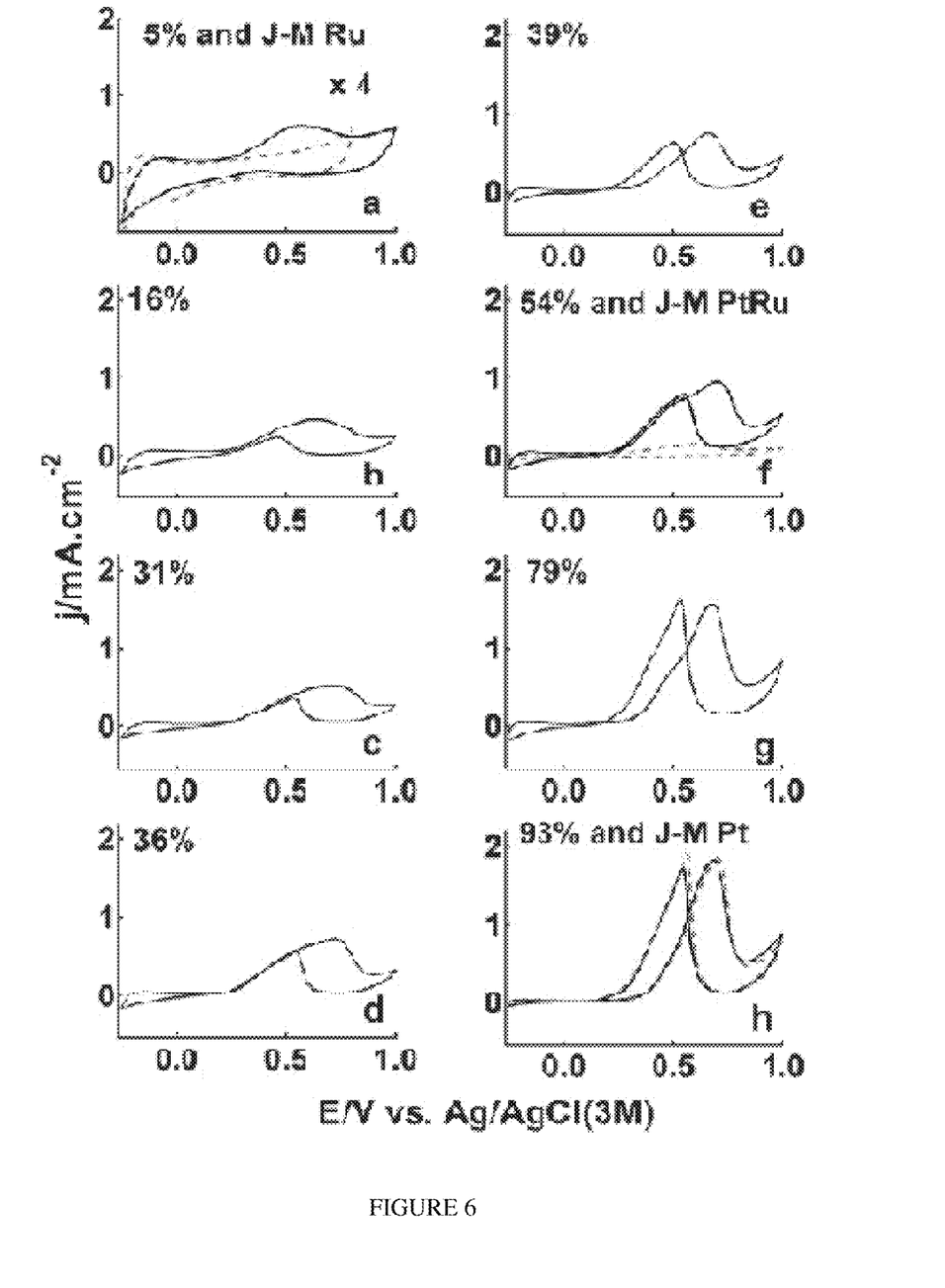
FIG. 6 shows the CVs of MeOH electro-oxidation on the 8 Pt-decorated Ru samples. The CVs (dashed curves) on the J-M Ru, J-M PtRu (1:1) alloy, and J-M Pt NPs are also shown in (a), (f), and (h), respectively for the purpose of comparison.

FIG. 6 presents the MeOH electro-oxidation CVs of the 8 1st-batch and the reference samples. Those of the 3 2nd-batch samples are shown in FIG. S4 in the ESI†. The trend of variation is identical to that in FIG. 6. For the J-M Ru, no MeOH electro-oxidation activity was observed (dashed CV in FIG. 6*a*) which was in agreement with previous observations (*J. Phys. Chem. B*, 2005, 109, 17775-17780), although a recent surface enhanced Raman scattering study by Zou et al. suggested that RuNPs may have observable MeOH activity at room temperature (*J. Phys. Chem. B*, 2006, 110, 17296-17301).

However, a deposition of a merely 5% of Pt already initiated small but observable MeOH activity (FIG. 6*a*). This is in contrast to the Pt deposited on a polycrystalline Au substrate on which no MeOH activity was observed at coverage as high as 22% (*J. Phys. Chem. B*, 2005, 109, 17775-17780). This may be rationalized by the difference in Pt—Au and Pt—Ru interactions: Pt solute has a very strong tendency to segregate in a Ru host but a strong tendency towards anti-segregation in an Au host (*Adv. Catal.*, 2000, 45, 71-129). This difference led the Pt to form a segregated Pt adlayer phase (islands) on Ru during the EG reduction period that satisfied the ensemble requirement for the MeOH EO (*J. Phys. Chem. B*, 2005, 109, 17775-17780).

With the increase of the Pt PD, the transient peak current density of MeOH EO increased and there was a remarkably linear relationship between them as shown in FIG. 5(*b*) (y=ax with $R^2$=0.98). This linear relationship is a strong indication that the deposited Pt atoms were grouped in the form of surface islands since insulated Pt atoms would not be active for MeOH EO. As the Pt PD increased, the pattern of the CV became more and more similar to that of the pure J-M Pt NPs: they almost overlapped at the Pt PD of 0.93 (FIG. 6(*h*)).

This resemblance again indicates that the electronic effect of the Ru substrate became weaker at higher Pt coverage, i.e., the atoms in the Pt adlayer supported by RuNPs acted more like pure Pt atoms rather than those alloyed to the Ru, as already pointed out in the above discussions of the XRD results.

This observation is further substantiated by the striking difference observed between the CV of the Pt(54)-Ru and that of the J-M PtRu (1:1) alloy NPs (FIG. 6*f*). The latter resembled more that of the Pt(5)-Ru (FIG. 6*a*). Considering that a nominally 45% Pt is expected on the surface of the PtRu alloy NPs, these observations are somewhat unexpected. Two reasons may account for the observations: One is a high segregation of the Ru on the surface of the alloy NPs as recently observed by $^{195}$Pt NMR of PtRu alloy NPs (*J. Am. Chem. Soc.*, 2007, 129, 13806; *J. Chem. Phys.*, 2008, 128, 052311). The other is a solid solution of alloying that resulted in a large part of the Pt sites having insufficient Pt neighbors to form an ensemble needed for MeOH electro-oxidation (*J. Phys. Chem. B*, 2005, 109, 17775-17780), i.e., the so-called ensemble effect (*Catal. Today*, 1997, 38, 445-457).

Figure 7:
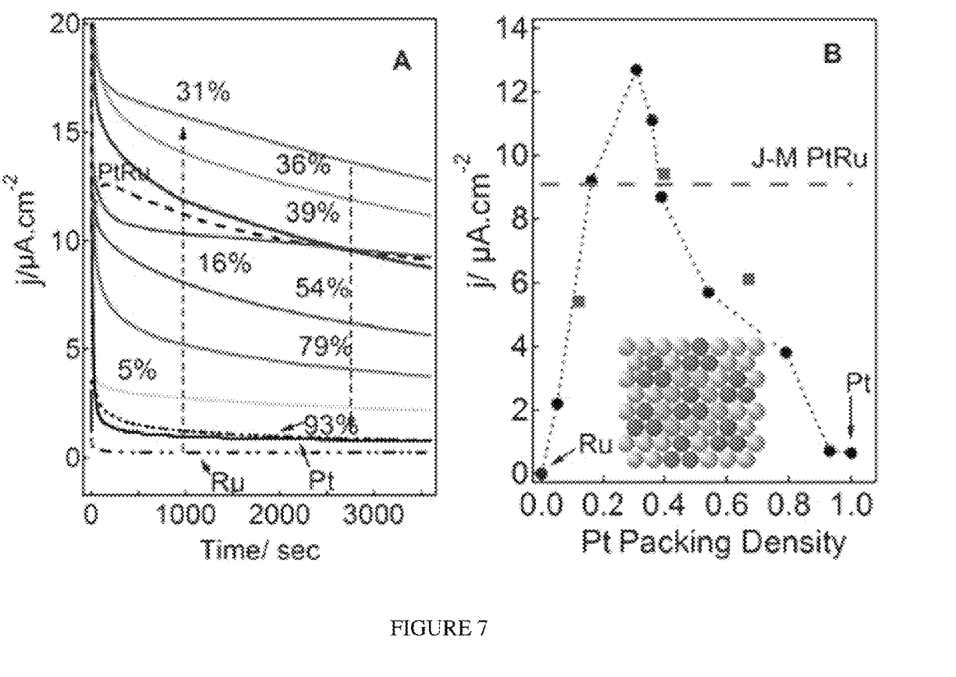
FIG. 7 shows (A) The CAs of the 8 Pt-decorated RuNP samples. The CAs of the J-M Ru, J-M PtRu (1:1) alloy, and J-M Pt NPs are also shown for the purpose of comparison. (B) The volcano-like curve of CA currents measured at 60 min as a function of the Pt coverage. The inset in (B) is a surface structure model (dark spheres for Pt atoms and light spheres for Ru atoms with each Pt 3-atom ensemble having 9 nearest Ru neighbors) that consists of ensembles of 3 Pt atoms on Ru(0001) and simultaneously has the maximum numbers of Pt ensembles and of Pt/Ru sites. The corresponding Pt PD=3/7=0.43.

In the real-world DMFC applications, the long-term CO tolerance of electrocatalysts is practically more important than the intrinsic MeOH EO activity as measured by the transient peak current in FIG. 6. In this regard, CA measurements were carried at 0.2 V on the 11 Pt-adlayered RuNP samples to gauge their respective CO tolerance in a 0.5 M MeOH-containing electrolyte solution. The resulting CA curves of the 8 1st-batch samples are shown in FIG. 7A (those of the 3 2nd-batch samples in FIG. S5 in the ESI†). As can be seen, and in agreement with the results presented in FIG. 6 and the extrapolation of the straight line in FIG. 5(*b*) to zero, the J-M RuNPs did not show any observable MeOH reactivity. On the other hand, the Pt(93)-Ru sample acted almost the same as the pure J-M Pt NPs. However, the J-M PtRu showed a much higher activity (i.e. CO tolerance) than both Pt(5)-Ru, Pt(12)-Ru, and Pt(54)-Ru, which seems to be contradictory to the observation gleaned from FIG. 5(*a*) where higher CO stripping peak potential was observed for J-M PtRu. The exact reason is unclear.

Figure 8:
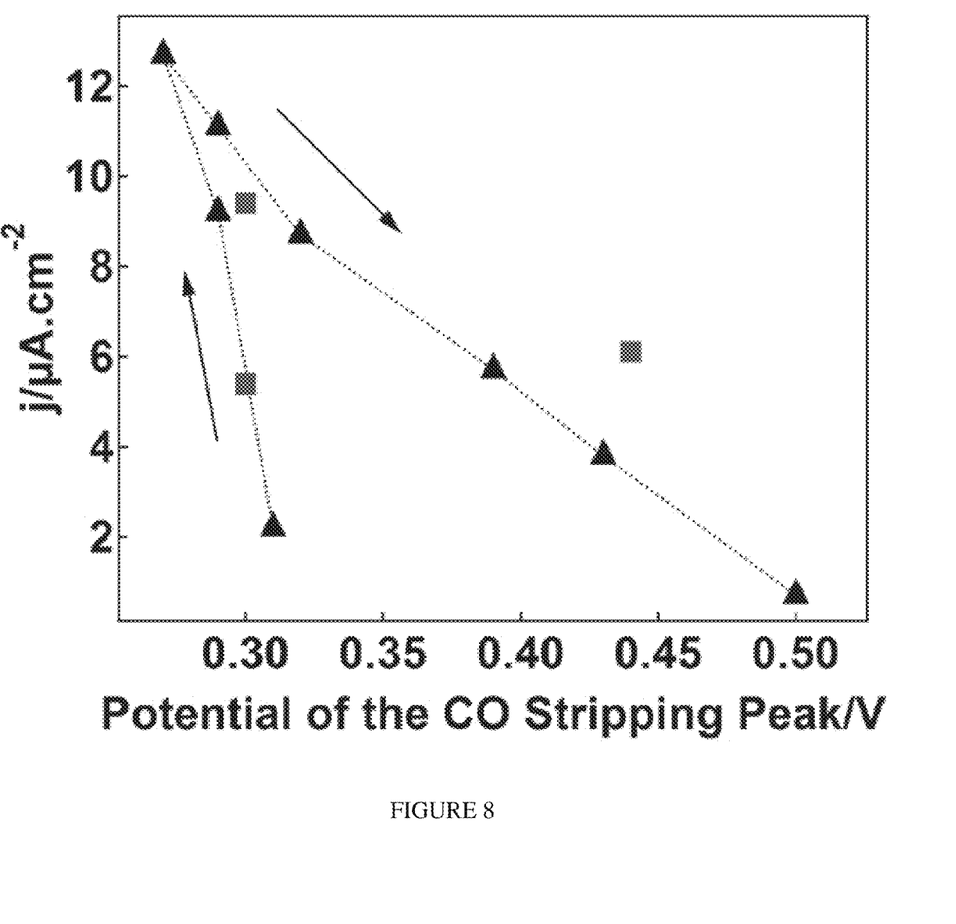
FIG. 8 shows the correlation between the long-term steady-state current density of the MeOH electro-oxidation and the potential of the CO stripping peak. The squares are for the three second batch samples. The Pt coverage is the implicit parameter in this plot with the arrows indicating the direction of the increasing coverage.

On the other hand, the CA currents for the 11 Pt-adlayered Ru samples closely follow the trend of the CO stripping peak potential as a function of the Pt PD, as shown in FIG. 8. When the CA currents measured at 60 min of the MeOH reaction are plotted as a function of the Pt PD, an expected volcano-like curve as shown in FIG. 7B is observed with the maximum current at the PD of 0.31 that coincides with the lowest CO stripping peak potential (FIG. 8). This volcano curve can be understood as the result of two competing processes in MeOH EO on a Pt-adlayered RuNP surface: the triple dehydrogenation reaction steps being facilitated by the increased Pt ensemble sites that would lead to the generation of more poisonous CO and the enhanced CO eliminating ability through the bifunctional mechanism offered by the presence of more adjacent Ru/Pt sites as well as the possible synergistic electronic (ligand and strain) effect at the lower Pt PDs that weakens the Pt—CO bonding (*Adv. Catal.*, 2000, 45, 71-129; *J. Am. Chem. Soc.*, 2002, 124, 468-473; *J. Chem. Phys.*, 2004, 120, 10240). As the Pt PD increased but before the volcano peak, the two processes could work in unison because both the dehydrogenating ensemble sites and the CO-eliminating ability increased (the latter is indicated by the continuous negative shift of the CO stripping peak potential), and so did the reaction current. Beyond the volcano peak, although a further increase in Pt coverage would increase the dehydrogenating ensemble sites, the accompanying decrease in the CO-eliminating ability, as indicated by the positive shift of the CO stripping peak potential (FIGS. 5 and 8), led to the decrease of the overall current. The difference in slope before and after the volcano peak as shown in FIG. 8 may be indicative of the difference in electronic effect of the Ru substrate which appeared to be stronger at lower Pt PDs (*Nat. Mater.*, 2004, 3, 810-815). Overall, one can conclude that the Pt(31)-Ru sample had a balance of surface structure/electronic effects that maximized the overall reaction current. This should be compared to the Ru-adlayered Pt NPs where the maximum activity appeared at 40 to 50% of Ru packing density (*J. Catal.*, 2001, 203, 1-6). Most remarkably, the Pt(31)-Ru sample showed an impressively high reactivity that was about 150% higher than that of the industrial benchmark J-M PtRu (1:1) alloy sample but with at least 3.5× less Pt loading. It is also worth noting that the Pt(16), Pt(36), and Pt(39)/(40)-Ru samples all showed either higher or comparable MeOH long-term activity as compared to that of the J-M PtRu (1:1) alloy sample but with lower Pt loadings.

4. CONCLUSIONS

In conclusion, a superior, industrially scalable one-pot EG based wet chemistry method to prepare Pt-adlayered RuNPs has been developed that offers an exquisite control of the Pt PD of the Pt adlayers with, most likely, mono-atomic height and effectively prevents the NPs sintering during the deposition. Using the 3 nm J-M RuNPs as the starting material, 11 samples with different Pt PD ranging from 0.05 to 0.93 were prepared, characterized, and studied in detail for the MeOH EO. A volcano curve in terms of long-term activity as a function of the Pt coverage was observed and peaked at the Pt PD of 0.31, attesting the competition of the two processes that are both essential for the MeOH EO: the triple dehydrogenation and the elimination of poisonous CO. An increase of the Pt ensemble sites will facilitate the former via the ensemble effect while an increase of the adjacent Ru/Pt sites will enhance the latter via the bifunctional mechanism. Assuming an ensemble of minimum three Pt atoms is needed for EO of MeOH, the surface structure shown in the inset of FIG. 7(B) gives, simultaneously, the maximum numbers of ensembles and of Pt/Ru sites on a Ru(0001) surface. The corresponding Pt PD is 3/7=0.43, reasonably close to the Pt PD (0.31) of the most active sample. Notice that Gasteiger et al. did a statistical analysis of a Pt—Ru alloy surface using a model of a 3 Pt atoms ensemble that had only one Ru atom as the nearest neighbor and found out the optimal Pt content was about 88% (*J. Phys. Chem.*, 1993, 97, 12020-12029). Thus, this simple analysis suggests that on Ru@Pt, more than one Pt/Ru site per Pt ensemble is needed to achieve the highest activity.

Additionally, the CO eliminating ability might also be enhanced at the lower Pt PDs by the electronic effect (*Adv. Catal.*, 2000, 45, 71-129; *J. Am. Chem. Soc.*, 2002, 124, 468-473; *J. Chem. Phys.*, 2004, 120, 10240; *Nat. Mater.*, 2004, 3, 810-815). The direct correlation between the long-term steady-state MeOH EO current density and the CO stripping peak potential highlights again the technological importance of optimizing this CO-eliminating ability. However, evidence suggested that, for the higher Pt PD adlayers formed on the RuNP surface, electronic effects exerted by the Ru substrate were very weak, if at all. This is in contrast to the theoretical calculations and warrants further scrutiny (*Adv. Catal.*, 2000, 45, 71-129; *J. Chem. Phys.*, 2004, 120, 10240; *Nat. Mater.*, 2004, 3, 810-815). Nonetheless, and most significantly, the reactivity of the Pt(31)-Ru sample was about 150% higher than that of the industrial benchmark J-M PtRu (1:1) alloy sample but with 3.5 times less Pt loading. The specific activity we obtained is generally higher than or at least comparable to those of the systems made by spontaneous depositions via repetitive hydrogen reductions (*J. Power Sources*, 2005, 141, 1-7). Considering that Ru is currently about seven times less expensive than Pt, using the Pt(31)-Ru NPs would lower the electrode material cost by more than 50% compared to using the industrial benchmark J-M PtRu (1:1) alloy NPs for DMFC applications. Furthermore, the wet chemistry based EG method for the controlled deposition of submonolayer Pt is advantageous in terms of processing and maximizing the use of Pt and can, in principle, be scaled up straightforwardly to an industrial level.

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed is:

1. A process for depositing a platinum (Pt) adlayer on a ruthenium (Ru) nanoparticle which comprises a polyol reduction.

2. The process according to claim 1, wherein the polyol reduction is an ethylene glycol reduction.

3. The process according to claim 2, wherein the ethylene glycol reduction comprises:
   a. cleaning the surface of the ruthenium nanoparticles so that the surface is free of ruthenium oxide by reducing the surface of the ruthenium nanoparticles;
   b. dispersing ruthenium nanoparticles ultrasonically into a first solution of ethylene glycol,
   c. heating the first solution to between about 120-160° C.,
   d. redispersing the surface cleaned ruthenium nanoparticles into a second solution of ethylene glycol, wherein said second solution further comprises a platinum (IV) compound
   e. ultrasonicating said second solution, and
   f. heating said second solution to between about 100-140° C., thereby depositing a platinum adlayer on the ruthenium nanoparticle.

4. The process of claim 3, wherein the platinum of the platinum (IV) compound is reduced to Pt (0).

5. A process according to claim 4, wherein a platinum-ruthenium alloy is not formed and sintering of the ruthenium nanoparticle does not occur during the depositing the platinum adlayer on the ruthenium nanoparticle.

6. The process of claim 4, wherein the platinum adlayered on the ruthenium nanoparticle covers from 30%-50% of the surface area of the ruthenium nanoparticle.

7. The process of claim 4, wherein the 0-5% by weight of platinum enters the core of the ruthenium nanoparticle.

8. The process of claim 4, wherein the yield of the platinum adlayered onto the surface of the ruthenium nanoparticle is 80% to 100%.

9. The process of claim 4, wherein no further reducing of the surface of the ruthenium nanoparticle is performed after the initial reduction.

\* \* \* \* \*